United States Patent
Johnston et al.

(10) Patent No.: US 8,692,736 B1
(45) Date of Patent: Apr. 8, 2014

(54) CONFIGURABLE KEYPAD FOR AN ELECTRONIC DEVICE

(75) Inventors: John E. Johnston, Seattle, WA (US); Greg Zehr, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 1617 days.

(21) Appl. No.: 11/763,346

(22) Filed: Jun. 14, 2007

(51) Int. Cl.
G09G 5/00 (2006.01)

(52) U.S. Cl.
USPC .......................................... 345/1.2; 345/107

(58) Field of Classification Search
None
See application file for complete search history.

(56) References Cited

U.S. PATENT DOCUMENTS

| | | | |
|---|---|---|---|
| 6,356,287 B1 * | 3/2002 | Ruberry et al. | 715/864 |
| 6,657,679 B2 | 12/2003 | Hayes et al. | |
| 6,788,241 B2 | 9/2004 | Arling et al. | |
| 6,791,467 B1 | 9/2004 | Ben-Ze'ev | |
| 6,968,570 B2 | 11/2005 | Hayes et al. | |
| 7,010,805 B2 | 3/2006 | Hayes et al. | |
| 7,046,161 B2 | 5/2006 | Hayes | |
| 7,091,898 B2 | 8/2006 | Arling et al. | |
| 7,142,127 B2 | 11/2006 | Hayes et al. | |
| 7,154,428 B2 | 12/2006 | de Clereq et al. | |
| 2006/0066503 A1 * | 3/2006 | Sampsell et al. | 345/1.1 |
| 2006/0146027 A1 * | 7/2006 | Tracy et al. | 345/168 |
| 2006/0181515 A1 * | 8/2006 | Fletcher et al. | 345/173 |
| 2006/0256090 A1 | 11/2006 | Huppi | |
| 2007/0213090 A1 * | 9/2007 | Holmberg | 455/550.1 |
| 2008/0072163 A1 * | 3/2008 | Teng et al. | 715/761 |

OTHER PUBLICATIONS

"One for All Kameleon 8 Device Universal Remote Manual", http://www.mykameleon.com/downloads/user_manuals/OFA_kameleon8_manual.pdf, Jun. 21, 2007.
"Philips Pronto TSU9600 Remote Control", http://www.pronto.philips.com/library/documents/TSU9600_SGEND_EN. pdf, Jul. 11, 2007.
"Optimus Maximux Keyboard", http://www.artlebedev.com/everything/optimus/, Jul. 11, 2007.
"Motorola Motofone", http://www.motorola.com/motoinfo/product/details.jsp?globalObjectId=164, Jul. 11, 2007.

* cited by examiner

Primary Examiner — Adam R Giesy
(74) Attorney, Agent, or Firm — Lee & Hayes, PLLC (57) ABSTRACT

An electronic book reading device with a configurable keypad is described. The device includes a first display configured to display visual representations of content of an electronic book. The device further includes a second display configured to display a plurality of different button configurations, one button configuration being displayed at a time. The device also includes a switch array disposed under the second display, wherein the switch array is configured to receive user input and provide tactile feedback when the user input is received. The device includes a processor and memory in electronic communication with the processor. Instructions are stored in the memory. The instructions are executable to process the user input and change a button configuration on the second display from a first button configuration to a second button configuration.

37 Claims, 9 Drawing Sheets

CONFIGURABLE KEYPAD FOR AN ELECTRONIC DEVICE

TECHNICAL FIELD

The present disclosure relates generally to electronic devices and computer-related technologies. More specifically, the present disclosure relates to a configurable keypad for an electronic device.

BACKGROUND

Electronic distribution of information has gained in importance with the proliferation of personal computers and has undergone a tremendous upsurge in popularity as the Internet has become widely available. With the widespread use of the Internet, it has become possible to distribute large, coherent units of information using electronic technologies.

Electronic technologies, such as computer technologies, relating to reducing the size and increasing the complexity of electronics have permitted computers to be packaged into smaller and more powerful electronic devices. An electronic device may be used to receive and process information. The electronic device may provide compact storage of the information as well as ease of access to the information. For example, a single electronic device may store a large quantity of information that might be downloaded instantaneously at any time via the Internet. In addition, the electronic device may be backed up, so that physical damage to the device does not necessarily correspond to a loss of the information stored on the device.

In addition, a user may interact with the electronic device. For example, the user may read information that is displayed by the electronic device. Further, the user may instruct the device to display a specific piece of information stored on the electronic device. As such, benefits may be realized from improved systems and methods for interacting with an electronic device.

DETAILED DESCRIPTION

An electronic book reading device with a configurable keypad is described. The device includes a first display configured to display visual representations of content of an electronic book. The device further includes a second display configured to display a plurality of different button configurations, one button configuration being displayed at a time. The device also includes a switch array disposed under the second display, wherein the switch array is configured to receive user input and provide tactile feedback when the user input is received. The device includes a processor and memory in electronic communication with the processor. Instructions are stored in the memory. The instructions are executable to process the user input and change a button configuration on the second display from a first button configuration to a second button configuration.

In one embodiment, a function of a first button may change when the button configuration is changed from the first button configuration to the second button configuration.

The first display and the second display may be implemented in various ways. For example, the first display and the second display may be adjacent and coplanar. The second display may comprise a flexible display. Furthermore, the second display may comprise a graphic display or a character display.

The switch array may comprise a plurality of dome switches.

In one embodiment, changing the button configuration on the second display from the first button configuration to the second button configuration may cause certain buttons to disappear from the second display, and subsequently changing the button configuration back to the first button configuration may cause the certain buttons to reappear.

The plurality of different button configurations may be stored in the memory. The plurality of different button configurations may include a reading mode button configuration and a searching mode button configuration.

An electronic device is also disclosed. The device includes a button display configured to display a plurality of button configurations. The device also includes a plurality of sensors configured to receive input and provide sensory feedback when input is received. The device includes a processor and memory in electronic communication with the processor. Instructions are stored in the memory. The instructions are executable to process the user input and display different button configurations on the button display. In some embodiments, the sensory feedback may be auditory, tactile or visual.

A method for using a configurable keypad on an electronic device is also disclosed. A keypad in a first keypad configuration is displayed on a button display of an electronic device. Input from a user is received. Tactile feedback is provided to the user when the input is received. Based on the input, it is determined whether to change the keypad to a second keypad configuration. The second keypad configuration is different from the first keypad configuration. The second keypad configuration is displayed on the button display if it was determined that the keypad should be changed.

An electronic device is also disclosed which includes means for displaying a plurality of button configurations and means for receiving input. The device also includes means for providing sensory feedback when the input is received. Means for processing the input is also included. The device further includes means for displaying different button configurations on the button display.

Several exemplary embodiments are now described with reference to the Figures. This detailed description of several exemplary embodiments, as illustrated in the Figures, is not intended to limit the scope of the claims.

The word "exemplary" is used exclusively herein to mean "serving as an example, instance or illustration." Any embodiment described as "exemplary" is not necessarily to be construed as preferred or advantageous over other embodiments.

As used herein, the terms "an embodiment," "embodiment," "embodiments," "the embodiment," "the embodiments," "one or more embodiments," "some embodiments," "certain embodiments," "one embodiment," "another embodiment" and the like mean "one or more (but not necessarily all) embodiments," unless expressly specified otherwise.

The term "determining" (and grammatical variants thereof) is used in an extremely broad sense. The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The following systems and methods describe a keypad that can be configured and reconfigured based on the context and/or on user input. In certain situations with an electronic device, access to the full range of key functions presented may have limited value. In addition, a display of the full range of key functions on the keypad may create visual clutter that can detract from the user's experience. For instance, when using an electronic book reading device, the user may be engaged mostly in page turning. The keypad functions do little to enhance that experience and the presence of the keys may discourage the user from holding the unit in the keypad area, despite the fact that this may be desirable for reading comfort. The presentation of keys or buttons not used in context also may tend to hide or obscure the presence of keys that could be useful. For instance, if the user is simply reading information on the device, presence of the QWERTY keys may not be helpful but they do serve to inadvertently hide or obscure the buttons or keys that are mainly used for reading. The value and function of the keypad or keyboard would be enhanced if the device were capable of presenting key functions that were meaningful for the activity the user is engaged in.

Figure 1:
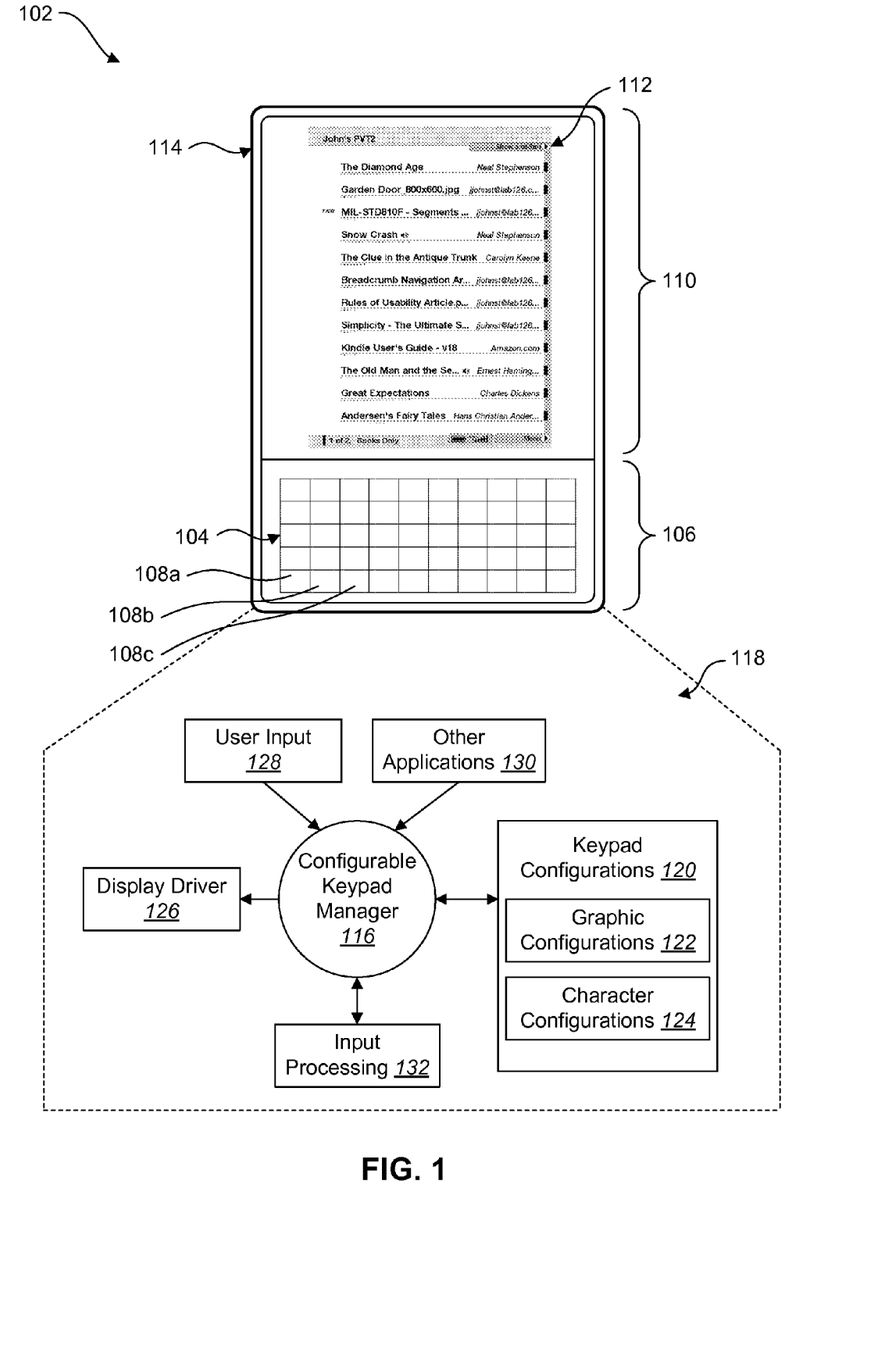
FIG. 1 illustrates an embodiment of an electronic device with a configurable keypad.

FIG. 1 illustrates an embodiment of an electronic device 102 including a configurable keypad 104. The electronic device 102 may include a button display 106 configured to display a plurality of button configurations. The keypad 104 displayed by the button display 106 includes a plurality of individual buttons 108a, 108b, 108c, etc. A plurality of sensors are configured to receive input and provide sensory feedback when input is received, which will be discussed below.

The electronic device 102 may include a graphic display 110 configured to display visual representations of electronic information 112. In the embodiment shown in FIG. 1, the graphic display 110 may be adjacent to and coplanar with the button display 106. An enclosure 114 houses the electronic components that comprise the electronic device 102.

A configurable keypad manager 116 may manage the button display 106. A block diagram 118 illustrates one embodiment of the configurable keypad manager 116 operation. Different keypad configurations 120 may be accessed by the configurable keypad manager 116 to be displayed on the button display 106. The keypad configurations 120 may include graphic configurations 122 and/or character configurations 124. The graphic configurations 122 may be used for button displays 106 that are graphic-based displays. Herein a graphic-based display includes displays that may be controlled at a pixel level. The character configurations 124 may be used for button displays 106 that are character-based displays. Herein a character-based display includes displays that may be controlled based on the design characters of the character display.

When it is determined that a new button configuration is to be displayed on the button display 106, the configurable keypad manager 116 identifies the new button configuration from the keypad configurations 120 and provides the new button configuration to a display driver 126. The display driver 126 causes the button display 106 to change based on the new button configuration.

Various inputs to the configurable keypad manager 116 may cause the configurable keypad 104 to be reconfigured. User input 128 may cause the configurable keypad 104 to be reconfigured. Other applications 130 or programs 130 running on the electronic device 102 may cause the configurable keypad 104 to be reconfigured. The configurable keypad manager 116 may receive other inputs from other input processing components 132 that may cause the configurable keypad 104 to be reconfigured.

Figure 2:
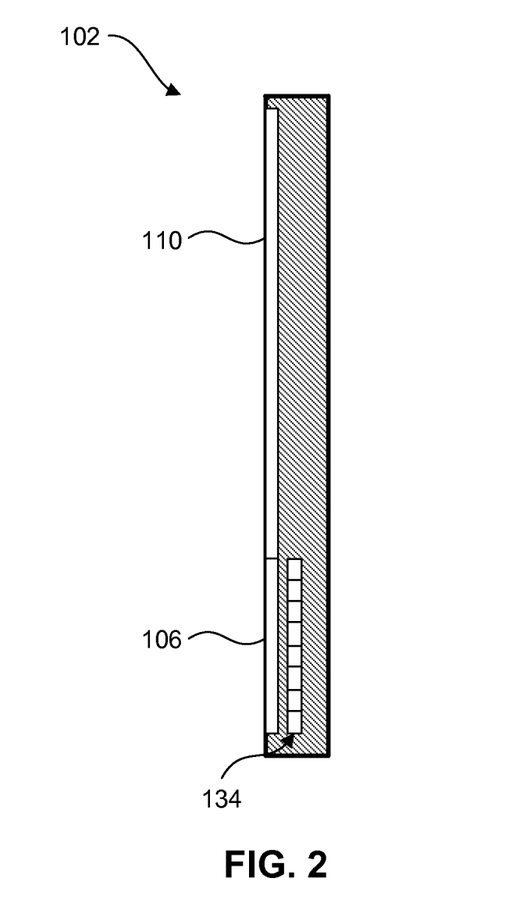
FIG. 2 is a side cross-sectional view of the electronic device of FIG. 1.

FIG. 2 is a side cross-sectional view of the electronic device 102 of FIG. 1. The graphic display 110 is adjacent to the button display 106. A plurality of sensors 134 are positioned such that they can receive input via the button display 106 and provide sensory feedback when input is received. In the embodiment shown in FIG. 2, the plurality of sensors 134 are under the button display 106.

Figure 3:
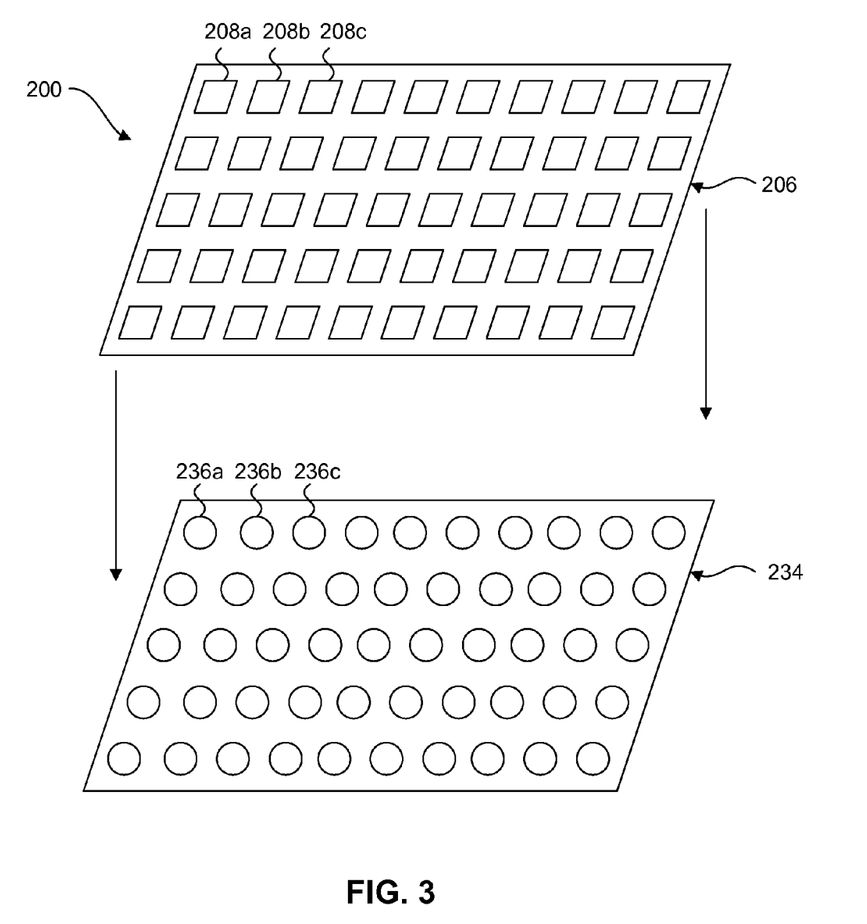
FIG. 3 is a perspective view illustrating a button display and a switch array.
Figure 4:
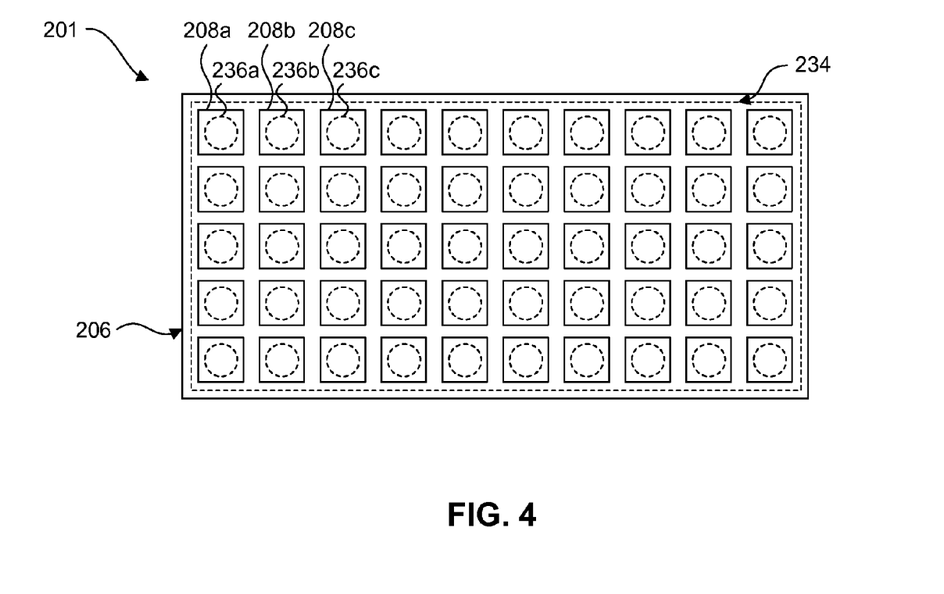
FIG. 4 is a top view of the button display and the switch array of FIG. 3 in their final aligned position.

FIG. 3 is a perspective view 200 illustrating a button display 206 and a switch array 234. In the embodiment shown in FIG. 3, the button display 206 is being placed over the switch array 234, but is not yet in its final position. The final position is illustrated in FIG. 4, below. The button display 206 may include a plurality of button areas 208a, 208b, 208c, etc. The button areas 208 may not be visually perceptible to a user until the button display 206 is powered and displays a configurable keypad 104.

As discussed in relation to FIG. 2, the electronic device 102 may include a plurality of sensors 134 under the button display 106. One embodiment of the plurality of sensors 134 may be the switch array 234 shown in FIG. 3. The switch array 234 includes a number of switch elements 236a, 236b, 236c, etc. In the embodiment of FIG. 3, the button display 206 displays button areas 208 aligned with the switch elements 236 of the switch array 234.

In one embodiment, the switch elements 236 may comprise tactile domes. A key press is registered separately through the closing of the dome switch, while the dome switch also provides mechanical tactile feedback. An alternate embodiment may include a touch sensitive layer on the button display, such as a capacitive or resistive touch panel, to register the key press, and the dome switch below may be used to provide mechanical feedback to the user. Another embodiment may include other haptic feedback to provide tactile feeling (off center cam or solenoid to provide "bump") in place of dome switches.

As shown and discussed herein, some embodiments may provide tactile feedback in a configurable keypad. Flexible displays, such as those provided by e-paper, cholosteric and other technologies, could be combined with an array of tactile domes to create such a keypad. These embodiments may include a thin display, constructed with a flexible backplane such as a flexible circuit, stainless steel, plastic or other technology, assembled over an array of dome switches such that when the display is pressed in an appropriate location it triggers the dome switch.

FIG. 4 is a top view 201 of the button display 206 and the switch array 234 of FIG. 3 in their final aligned position. In this embodiment, the button areas 208 are aligned with and positioned on top of the switch elements 236 of the switch array 234. The button display 206 displays the button areas 208 aligned with the switch elements 236 of the switch array 234 such that when a user presses one of the buttons in one of the button areas 208, tactile feedback is provided through one of the switch elements 236.

Figure 5:
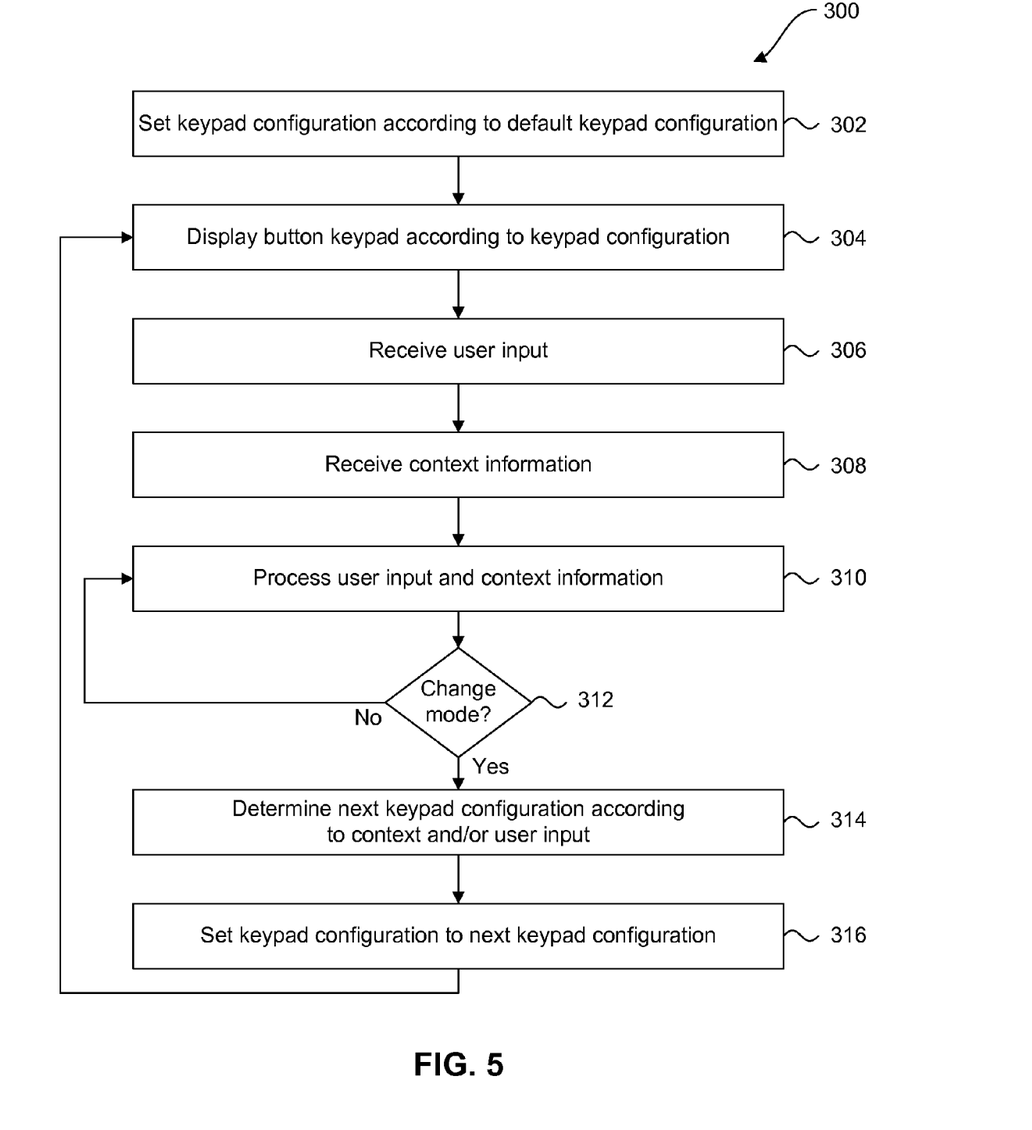
FIG. 5 is a flow diagram of an embodiment of a method for using a configurable keypad.

FIG. 5 is a flow diagram of an embodiment of a method 300 for using a configurable keypad with an electronic device. At startup, the electronic device 102 may set 302 the keypad configuration (or keypad mode) according to a default keypad configuration. A default keypad configuration may be specified in the keypad configurations 120. The device 102 then displays 304 a keypad 104 according to the keypad configuration.

The electronic device 102 may receive 306 user input from a user. Additionally, the electronic device 102 may receive 308 context information from other programs running on the device 102 or from other electronic devices (not shown). The user input and/or context information is processed 310 by the device 102. Based on the information processed 310, the device 102 may determine 312 whether the keypad mode or keypad configuration should be changed. If the keypad does not need to change, the device may continue processing 310 user inputs and context information. If the keypad 104 does need to change, the device may proceed with reconfiguring the keypad 104.

To change the keypad 104, the device may determine 314 the next keypad configuration according to context information and/or user input. The keypad configuration is then set 316 to the next keypad configuration. The device 102 then displays 304 a keypad according to this next keypad configuration.

Figure 6:
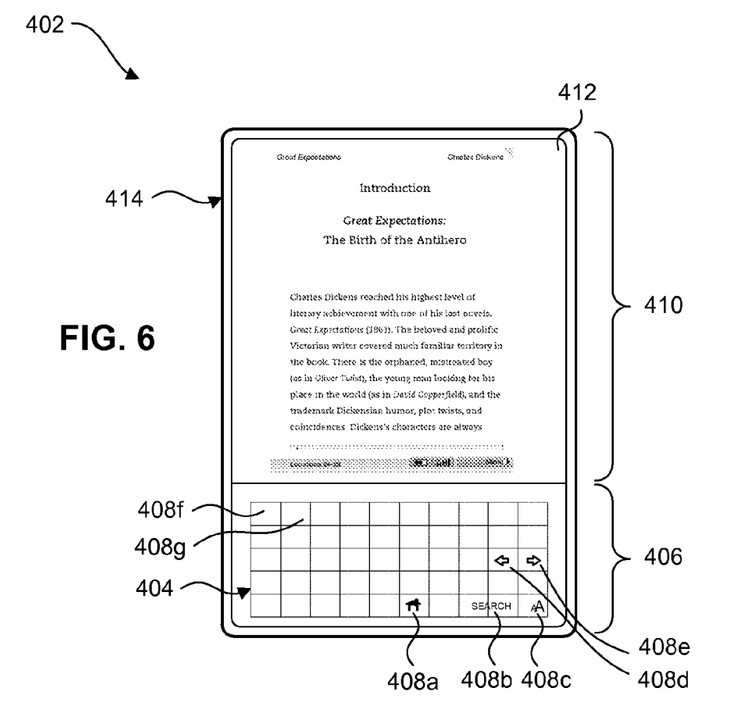
FIG. 6 illustrates an embodiment of an electronic book reading device including a configurable keypad.

FIG. 6 illustrates an embodiment of an electronic book reading device 402 including a configurable keypad 404. Electronic books ("eBooks") are digital works. The terms "eBook" and "digital work" are used synonymously and, as used herein, may include any type of content which can be stored and distributed in digital form. By way of illustration, without limitation, digital works and eBooks can include all forms of textual information such as books, magazines, newspapers, newsletters, periodicals, journals, reference materials, telephone books, textbooks, anthologies, proceedings of meetings, forms, directories, maps, manuals, guides, references, photographs, articles, reports, documents, etc., and all forms of audio and audiovisual works such as music, multimedia presentations, audio books, movies, etc.

The electronic book reading device 402 may include a button display 406 configured to display a plurality of button configurations. The keypad 404 displayed by the button display 406 includes a plurality of individual buttons 408a-408g.

The electronic book reading device 402 may include a graphic display 410 configured to display visual representations of electronic information 412 which includes electronic books or digital works. In the embodiment shown in FIG. 6, an enclosure 414 houses the electronic components that comprise the electronic book reading device 402.

The keypad 404 displayed in FIG. 6 is an example of a keypad for reading electronic books. The number of individual buttons has been reduced for this reading mode. In this embodiment, the keypad 404 includes a home button 408a, a search button 408b, a font size button 408c, a forward button 408e and a back button 408d. Some button areas 408f, 408g do not include visible buttons in this reading mode.

The electronic book reading device 402 may have entered this reading mode based on user input indicating that an electronic book should be opened. In addition, the context may have indicated that the device 402 should enter this reading mode.

Figure 7:
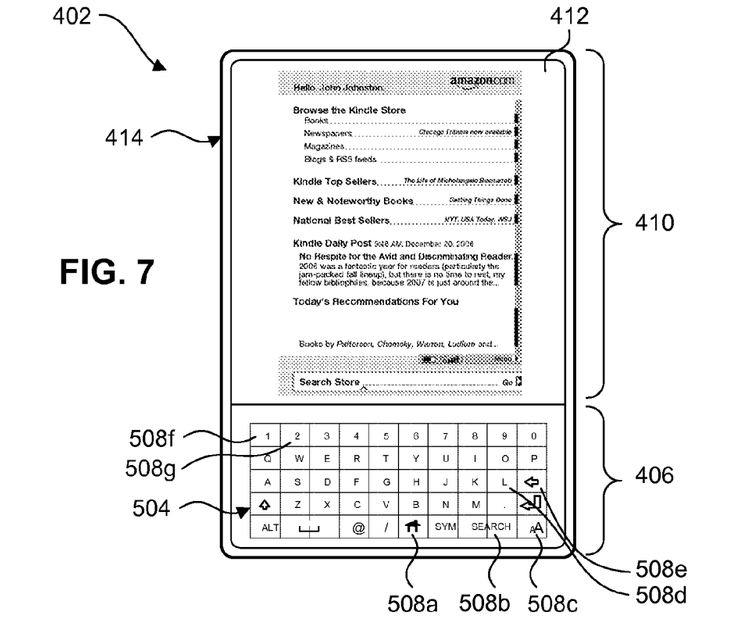
FIG. 7 illustrates the embodiment of the electronic book reading device of FIG. 6 where the keypad has been reconfigured to a keypad for searching.

FIG. 7 illustrates the embodiment of the electronic book reading device 402 of FIG. 6 where the keypad 404 has been reconfigured to a keypad 504 for searching. The electronic book reading device 402 may have entered this searching mode based on user input indicating that the user would like to perform a search. The keypad 504 of FIG. 7 displayed by the button display 406 includes a plurality of individual buttons 508 and is an example of a keypad 504 for searching. The searching keypad 504 includes more individual buttons than the reading mode keypad 404. Some buttons may be the same in different keypad configurations. For example, the searching keypad 504 and the reading mode keypad 404 both have a home button 408a, 508a, a search button 408b, 508b, and a font size button 408c, 508c. The functionality of some buttons may change from one mode to another. For example, the area of the button display 406 that was a back button 408d in reading mode is now an "L" button 508d in searching mode, and the area of the button display 406 that was a forward button 408e in reading mode is now a back button 508e in searching mode. Some buttons may disappear and/or reappear from one mode change to another. For example, the areas of the button display 406 that were button areas 408f, 408g in reading mode are now the "1" button 508f and the "2" button 508g in searching mode.

Figure 8:
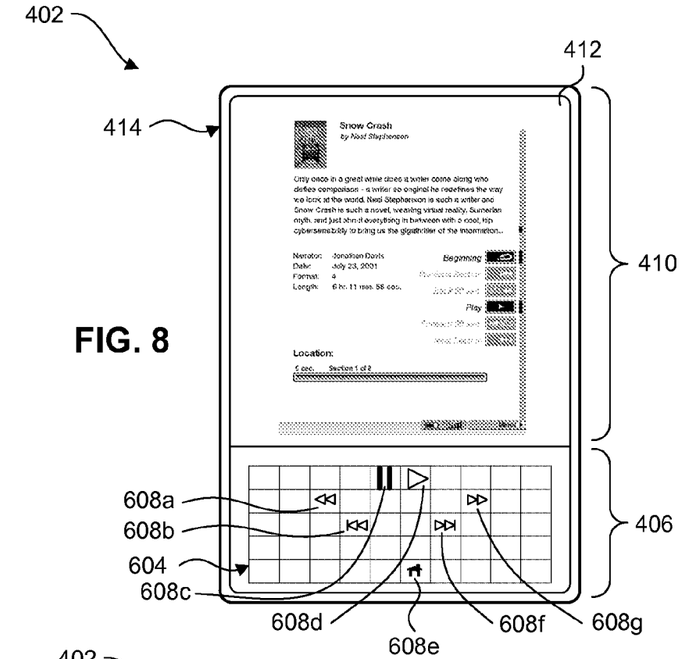
FIG. 8 illustrates the embodiment of the electronic book reading device of FIG. 6 where the keypad has been reconfigured to a keypad for multimedia.

FIG. 8 illustrates the embodiment of the electronic book reading device 402 of FIG. 6 where the keypad 404 has been reconfigured to a keypad 604 for multimedia (audio/video). The electronic book reading device 402 may have entered this multimedia mode based on user input indicating that he or she would like to watch a video or listen to a sound file, based on the context of the device 402, or based on other inputs or information provided to the device 402. The keypad 604 of FIG. 8 displayed by the button display 406 includes a plurality of individual buttons 608 and is only one possible example of a keypad 604 for a multimedia mode. In this embodiment, the keypad 604 for the multimedia mode includes a rewind button 608a, a previous section button 608b, a pause button 608c, a play button 608d, a home button 608e, a next section button 608f and a fast-forward button 608g.

Figure 9:
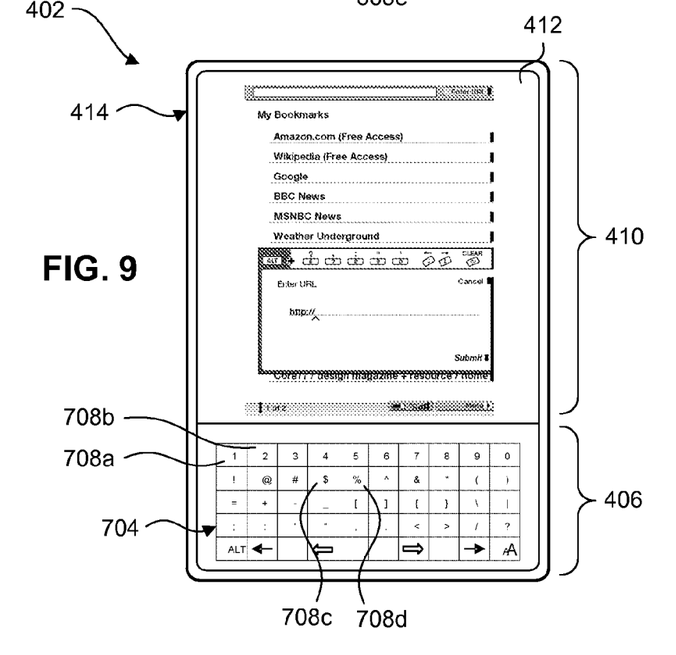
FIG. 9 illustrates the embodiment of the electronic book reading device of FIG. 6 where the keypad has been reconfigured to a keypad with special functions.

FIG. 9 illustrates the embodiment of the electronic book reading device 402 of FIG. 6 where the keypad 404 has been reconfigured to a keypad 704 with special functions. The electronic book reading device 402 may have entered this special function mode based on user input or context information. In this embodiment, the keypad 704 with special functions may include some buttons that are also available in other modes (e.g., the "1" button 708a and the "2" button 708b). The keypad 704 with special functions may include some buttons that are not available in other modes (e.g., the "$" button 708c and the "%" button 708d).

Figure 10:
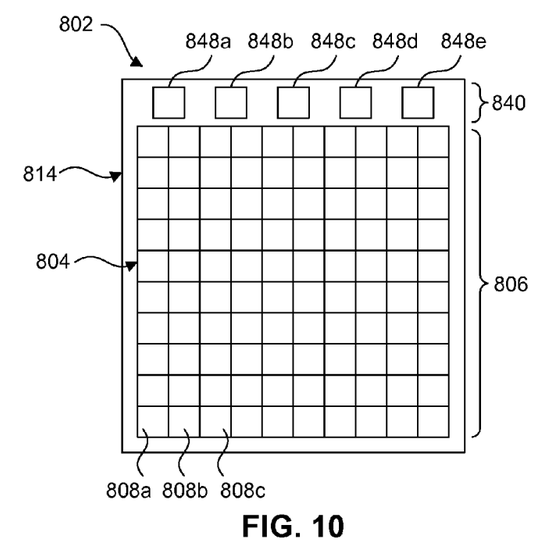
FIG. 10 illustrates a further embodiment of an electronic device including a configurable keypad.

FIG. 10 illustrates a further embodiment of an electronic device 802 including a configurable keypad 804. The electronic device 802 may include a button display 806 configured to display a plurality of button configurations. The keypad 804 displayed by the button display 806 includes a plurality of individual buttons 808a, 808b, 808c, etc. The electronic device 802 may also include a set of buttons 848a-848e that are not reconfigurable. These dedicated keys or buttons 848a-848e are shown at the top of the electronic device 802. A plurality of sensors are configured to receive input and provide sensory feedback when input is received, which will be discussed below in relation to FIG. 11.

The embodiment of an electronic device 802 shown in FIG. 10 does not include a separate graphic display, but is a device 802 that may be dedicated to user input. An enclosure 814 houses the electronic components that comprise the electronic device 802.

Figure 11:
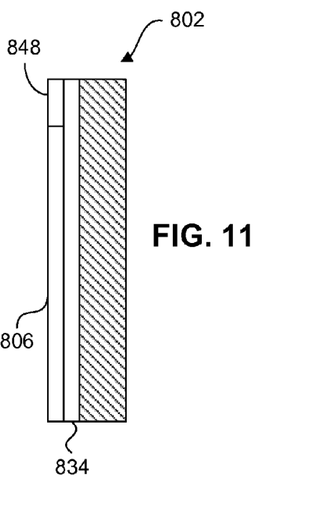
FIG. 11 is a side cross-sectional view of the electronic device of FIG. 10.

FIG. 11 is a side cross-sectional view of the electronic device 802 of FIG. 10. The buttons 848a-848e that are not configurable are adjacent to the button display 806. A plurality of sensors 834 are positioned such that they can receive input via the button display 806 and provide sensory feedback when input is received. In the embodiment shown in FIG. 11, the plurality of sensors 834 are under the button display 806.

Figure 12:
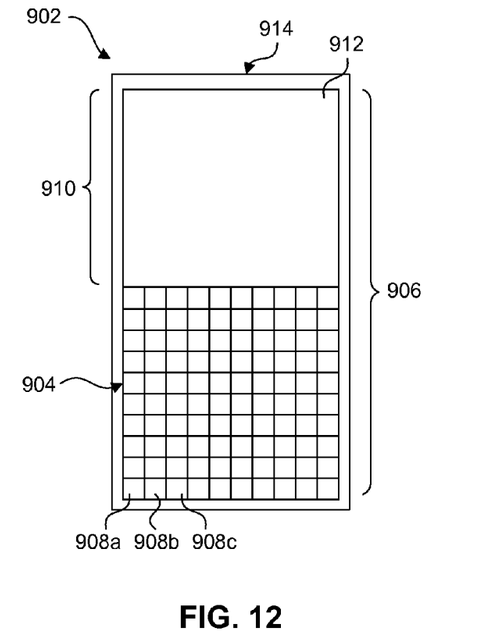
FIG. 12 illustrates a further embodiment of an electronic device including a configurable keypad.

FIG. 12 illustrates a further embodiment of an electronic device 902 including a configurable keypad 904. The electronic device 902 of FIG. 12 includes a button display 906 configured to display a plurality of button configurations as well as display visual representations of electronic information 912. The keypad 904 displayed by the button display 906 includes a plurality of individual buttons 908a, 908b, 908c, etc. An enclosure 914 houses the electronic components that comprise the electronic device 902.

The electronic device 902 of FIG. 12 uses the button display 906 to provide a graphic display 910 of visual representations of electronic information 912 to a user. The size of the graphic display 910 is configurable. In some modes, the configurable keypad 904 may be larger than the graphic display 910, while in other modes the configurable keypad 904 may be smaller than the graphic display 910. Additionally, there may be modes where the entire device 902 is being used as the configurable keypad 904 or as the graphic display 910.

Figure 13:
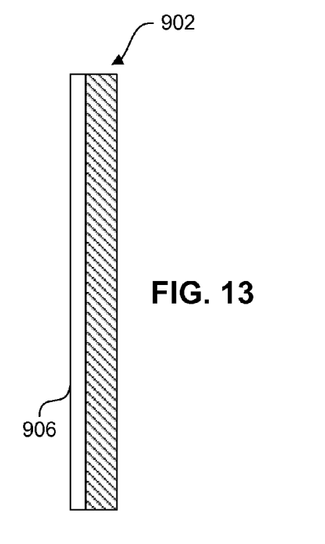
FIG. 13 is a side cross-sectional view of the electronic device of FIG. 12.

FIG. 13 is a side cross-sectional view of the electronic device 902 of FIG. 12. The plurality of sensors are being provided through the button display 906 that, in the embodiment of FIG. 13, includes touch screen capabilities. The touch screen aspect of the button display 906 receives input and provides sensory feedback when input is received.

Figure 14:
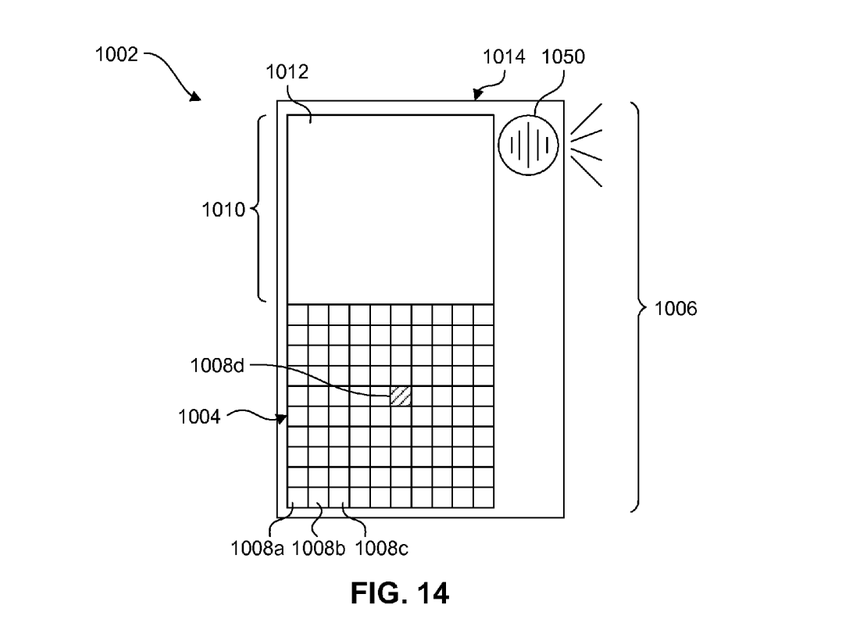
FIG. 14 illustrates a further embodiment of an electronic device including a configurable keypad.

FIG. 14 illustrates a further embodiment of an electronic device 1002 including a configurable keypad 1004. The electronic device 1002 of FIG. 14 includes a button display 1006 configured to display a plurality of button configurations as well as display visual representations of electronic information 1012. The keypad 1004 displayed by the button display 1006 includes a plurality of individual buttons 1008a, 1008b, 1008c, etc. An enclosure 1014 houses the electronic components that comprise the electronic device 1002.

The electronic device 1002 of FIG. 14 uses the button display 1006 to provide a graphic display 1010 of visual representations of electronic information 1012 to a user. The size of the graphic display 1010 is configurable. In some modes, the configurable keypad 1004 may be larger than the graphic display 1010, while in other modes the configurable keypad 1004 may be smaller than the graphic display 1010. Additionally, there may be modes where the entire device 1002 is being used as the configurable keypad 1004 or as the graphic display 1010.

The electronic device 1002 of FIG. 14 also illustrates additional ways in which sensory feedback may be provided when input is received. A speaker 1050 is included and may be used to provide auditory feedback when input is received. For example, a particular sound may be played through the speaker 1050 when a button or key is pressed. Another way in which sensory feedback may be provided is through visual feedback by changing the appearance of a button 1008d when it is pressed.

Figure 15:
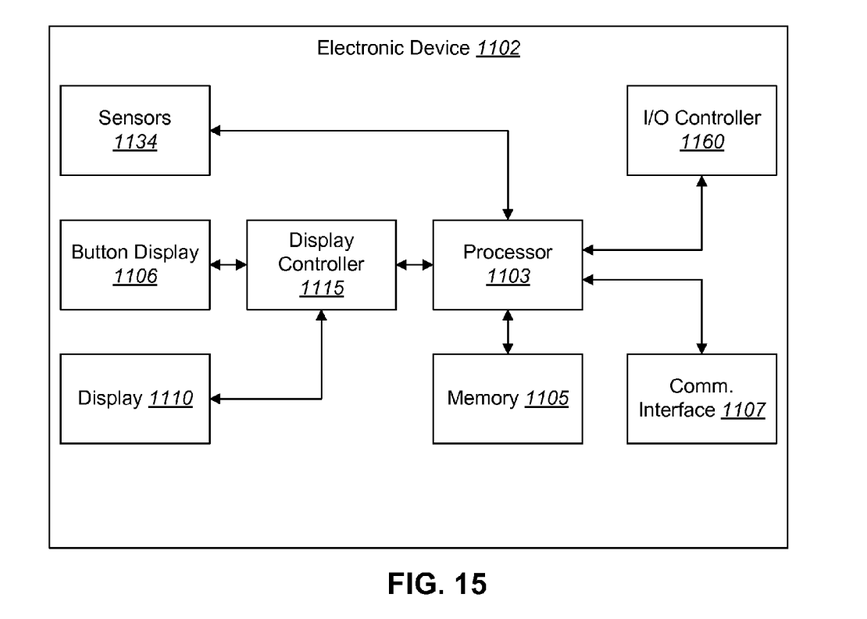
FIG. 15 is a block diagram illustrating components that may be utilized in an embodiment of an electronic device.

FIG. 15 is a block diagram illustrating components that may be utilized in an embodiment of an electronic device 1102. One embodiment of the electronic device 1102 may include an electronic reader, such as a handheld eBook reader. The device 1102 may also include other electronic devices or electronic readers besides eBook reader devices including, for example, personal computers, portable computers (e.g., laptops or pocket PCs), server computers, personal digital assistants (PDAs), embedded controllers, portable gaming devices, wireless phones, etc. As discussed above, the device 1102 includes a button display 1106. The device 1102 may also include an additional display 1110. One or more display controllers 1115 may also be provided to control the displays 1106, 1110. Some electronic paper displays that may be used with the implementations described herein include bi-stable LCDs, MEMS, cholesteric, pigmented electrophoretic, and others. Another electronic paper display that may be used is an E Ink-brand display.

Sensors 1134 may be used in combination with the button display 1106 to receive user input and provide sensory feedback. The sensors 1134 may provide tactile sensory feedback in one embodiment.

The electronic device 1102 may include a processor 1103 and memory 1105. The processor 1103 controls the operation of the device 1102 and may be embodied as a microprocessor, a microcontroller, a digital signal processor (DSP), state machine, etc. In addition, the processor may be implemented as a combination of computing devices, e.g., a combination of a DSP and a microprocessor, a plurality of microprocessors, one or more microprocessors in conjunction with a DSP core, or any other such configuration.

The processor 1103 may perform logical and arithmetic operations based on program instructions, or logical definitions, stored within the memory 1105 or circuits contained within the processor 1103. The memory 1105 may include any electronic component capable of storing electronic information, and may be embodied as read only memory (ROM), random access memory (RAM), magnetic disk storage media, optical storage media, flash memory devices in RAM, on-board memory included with the processor 1103, EPROM memory, EEPROM memory, registers, hard disk, a removable disk, a CD-ROM, etc. The memory 1105 may store program instructions and other types of data. The program instructions may be executed by the processor 1103 to implement some or all of the methods disclosed herein.

The device 1102 may include one or more communication interfaces 1107 for communicating with other devices. The communication interfaces 1107 may be used on wired communication technology, wireless communication technology, or both. Examples of different types of communication interfaces 1107 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

Additionally, an I/O controller 1160 may be included to control various aspects of input and output to and from the device 1102. Examples of different kinds of input controllers include a keyboard, mouse, microphone, remote control device, button, joystick, trackball, touchpad, lightpen, etc. Examples of different kinds of output controllers include a speaker, printer, etc. One specific type of output controller is a display device, such as the displays 1106, 1110. The display controller 1115 may convert data stored in the memory 1105 into text, graphics, and/or moving images (as appropriate) shown on one or more of the displays 1106, 1110.

Of course, FIG. 15 illustrates only one possible configuration of an electronic device 1102. Various other architectures and components may be utilized.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logical blocks, modules, circuits and algorithm steps described in connection with the embodiments disclosed herein may be implemented as electronic hardware, computer software or combinations of both. To clearly illustrate this interchangeability of hardware and software, various illustrative components, blocks, modules, circuits and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as limiting the scope of the claims.

The various illustrative logical blocks, modules and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described in connection with the embodiments disclosed herein may be embodied directly in hardware, in a software module executed by a processor or in a combination of the two. A software module may reside in any form of storage medium. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. An exemplary storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is required for proper operation of the embodiment that is being described, the order and/or use of specific steps and/or actions may be modified without departing from the scope of the claims.

While specific embodiments have been illustrated and described, it is to be understood that the claims are not limited to the precise configuration and components illustrated above. Various modifications, changes and variations may be made in the arrangement, operation and details of the embodiments described above without departing from the scope of the claims.

What is claimed is:

1. An electronic book reading device comprising:
    a first bi-stable display configured to couple to a first display controller and display visual representations of content of an electronic book;
    a second bi-stable display configured to couple to a second display controller and display a plurality of different button configurations, one button configuration being displayed at a time and comprising one or more button areas;
    a switch array disposed under the second bi-stable display, the second bi-stable display comprising a touch-sensitive layer to detect user input, and the switch array comprising dome switches to provide tactile feedback in response to the user input detected by the touch-sensitive layer;
    a processor;
    memory in electronic communication with the processor; and
    instructions stored in the memory, the instructions being executable to:
        process the user input; and
        direct the second display controller to change a button configuration on the second bi-stable display from a first button configuration to a second button configuration.

2. The electronic book reading device as defined in claim 1, wherein a function of a first button changes when the button configuration is changed from the first button configuration to the second button configuration.

3. The electronic book reading device as defined in claim 1, wherein the first display and the second display are adjacent and coplanar.

4. The electronic book reading device as defined in claim 1, wherein the second display comprises a flexible display.

5. The electronic book reading device as defined in claim 1, wherein the second display comprises a graphic display.

6. The electronic book reading device as defined in claim 1, wherein the second display comprises a character display.

7. The electronic book reading device as defined in claim 1, wherein changing the button configuration on the second display from the first button configuration to the second button configuration causes certain buttons to disappear from the second display, and subsequently changing the button configuration back to the first button configuration causes the certain buttons to reappear.

8. The electronic book reading device as defined in claim 1, wherein the plurality of different button configurations are stored in the memory.

9. The electronic book reading device as defined in claim 8, wherein the plurality of different button configurations includes a reading mode button configuration and a searching mode button configuration.

10. An electronic device comprising:
a bi-stable button display configured to couple to a display controller and display a plurality of button configurations, each of the button configurations presenting an associated character or graphic;
a plurality of dome switches disposed under the bi-stable button display, the bi-stable button display including a touch-sensitive layer configured to detect input, wherein at least one of the dome switches provides tactile feedback in response to the input;
a processor;
memory in electronic communication with the processor; and
instructions stored in the memory, the instructions being executable to:
process the input; and
responsive to the input, direct the display controller to display different button configurations on the bi-stable button display so that different characters or graphics are presented.

11. The electronic device as defined in claim 10, wherein a function of a first button changes when the button configuration is changed from a first button configuration to a second button configuration.

12. The electronic device as defined in claim 10, wherein the plurality of dome switches comprises a switch array.

13. The electronic device as defined in claim 10, wherein the button display comprises a flexible display.

14. The electronic device as defined in claim 10, wherein the button display comprises a graphic display.

15. The electronic device as defined in claim 10, wherein the button display comprises a character display.

16. The electronic device as defined in claim 10, wherein changing the button configuration on the button display causes certain buttons to disappear from the button display, and subsequently changing the button configuration causes the certain buttons to reappear.

17. A method comprising:
displaying a keypad in a first keypad configuration on a bi-stable button display of an electronic device;
receiving input comprising selection of one or more buttons of the displayed keypad from a user;
providing tactile feedback and visual feedback to the user in response to selection of individual buttons of the one or more buttons, the visual feedback comprising changing an appearance of a selected button of the one or more buttons;
determining, based on the input, whether to change the displayed keypad to a second keypad configuration, wherein the second keypad configuration is different from the first keypad configuration; and
displaying the second keypad configuration on the button display if it was determined that the keypad should be changed.

18. The method as defined in claim 17, wherein the electronic device is an electronic book reading device.

19. The method as defined in claim 17, wherein the tactile feedback is provided to the user through a plurality of dome switches disposed below the bi-stable button display, the bi-stable button display comprising a touch sensor configured to receive the input.

20. The method as defined in claim 17, wherein the button display comprises a flexible display.

21. The method as defined in claim 17, further comprising displaying visual representations of content of an electronic book.

22. The method as defined in claim 17, further comprising displaying visual representations of content of an electronic book on a graphic display that is adjacent to and coplanar with the button display.

23. The method as defined in claim 17, further comprising storing a plurality of different keypad configurations in a memory of the electronic device.

24. The method as defined in claim 17, wherein the input is received through at least one dome switch.

25. The method as defined in claim 17, wherein the input is received through a plurality of dome switches positioned under the button display.

26. An electronic device comprising:
one or more processors; and
one or more non-transitory computer-readable media storing instructions that are executable by the one or more processors to perform acts comprising:
displaying visual representations of electronic information on a first display;
displaying visual representations of electronic information describing a plurality of button configurations on a second display separate from the first display;
receiving input corresponding to a selection of a button of one of the button configurations displayed on the second display;
providing sensory feedback in response to the input, the sensory feedback including visual feedback comprising changing an appearance of the selected button to indicate selection of the selected button;
processing the input; and
electronically displaying different button configurations on the second display.

27. The electronic device as defined in claim 26, wherein a function of a first button changes when a button configuration is changed from a first button configuration to a second button configuration.

28. The electronic device as defined in claim 26, wherein the second display comprises a flexible display.

29. The electronic device as defined in claim 26, wherein the second display comprises a graphic display.

30. The electronic device as defined in claim 26, wherein the second display comprises a character display.

31. The electronic device as defined in claim 26, wherein the sensory feedback includes auditory feedback.

32. The electronic device as defined in claim 26, wherein the sensory feedback includes tactile feedback.

33. An electronic book reading device comprising:
a first display configured to display visual representations of electronic content of an electronic book;
a second display, independent and separate from the first display, configured to electronically display visual representations of a plurality of different button configurations, one button configuration being displayed at a time;
a processor;
a memory in electronic communication with the processor; and
instructions stored in the memory, the instructions being executable to:
process user input; and
provide visual feedback in response to selection of one or more buttons of a displayed button configuration, the visual feedback comprising changing an appearance of a selected button of the one or more buttons to indicate the selection of the selected button.

34. The electronic book reading device as defined in claim 33, wherein the first display and the second display are adjacent and coplanar.

35. The electronic book reading device as defined in claim 33, further comprising a switch array including a plurality of dome switches under the second display for providing tactile feedback in response to the selection of the selected button, wherein the second display comprises a touch-sensitive layer to detect the selection of the selected button.

36. The electronic book reading device as defined in claim 33, wherein the second display comprises a flexible electronic paper display.

37. The electronic book reading device as defined in claim 33, wherein the second display comprises a graphic electronic paper display.

* * * * *